United States Patent
King et al.

[15] 3,650,360
[45] Mar. 21, 1972

[54] TRUCK BRAKE

[72] Inventors: Robert L. King; Eloyce M. King, both of 610 Shore Pines Lake, Coos Bay, Gold Beach, Oreg. 97420

[22] Filed: Dec. 30, 1969

[21] Appl. No.: 889,270

[52] U.S. Cl. .................................. 188/330, 188/250 C
[51] Int. Cl. ........................... F16d 51/22, F16d 69/00
[58] Field of Search ............... 188/17, 18 R, 250 B, 250 C, 188/250 F, 327, 329, 330, 341

[56] References Cited

UNITED STATES PATENTS

| 1,743,412 | 1/1930 | Waite | 188/250 C |
| 1,915,857 | 6/1933 | Loughead | 188/330 X |
| 1,926,361 | 9/1933 | Bendix | 188/250 F |
| 2,116,174 | 5/1938 | Kay | 188/330 X |
| 3,368,648 | 2/1968 | Brownyer | 188/250 C |

Primary Examiner—Duane A. Reger
Attorney—Clarence A. O'Brien and Harvey B. Jacobson

[57] ABSTRACT

A wheel brake system for a truck or the like including a brake shoe having the usual semicylindrical band with a brake lining secured over its outer convex surface, but being provided with generally radially inwardly projecting apertured mounting lugs spaced along its arcuate extent. Each shoe further includes a pair of registered inner and outer arcuate plates over whose outer edge surfaces the concave inner surface of the band is disposed with the lugs carried by the band sandwiched and clamped between the plates by through bolts secured therethrough. The inner side plate, independent of the through bolts, is removably mounted in position whereby after the through bolts have been removed the inside plate may be axially withdrawn from the associated drum and the lining may thereafter also be axially withdrawn from the drum.

12 Claims, 7 Drawing Figures

Patented March 21, 1972

Robert L. King
Eloyce M. King
INVENTORS

BY *Clarence A. O'Brien*
and *Harvey B. Jacobson*
Attorneys

Patented March 21, 1972

Robert L. King
Eloyce M. King
INVENTORS

BY *Clarence A. O'Brien*
and *Harvey B. Jacobson*
Attorneys

Patented March 21, 1972

Robert L. King
Eloyce M. King
INVENTORS

BY Clarence A. O'Brien
and Harvey B. Jacobson
Attorneys

TRUCK BRAKE

Heavy duty brake systems utilized on trucks, buses and other heavy over-the-road vehicles include brake drums whose innermost axial ends are not covered by backing plates such as those utilized on most passenger vehicles provided with drum brakes. Accordingly, the brake shoes and lining of a heavy duty brake system are clearly visible from the inside of the associated wheel. However, although the brake shoes and lining are clearly visible they are not readily removable in that the associated wheel and drum must first be removed, in almost every instance.

Accordingly, although maintenance to be performed on a heavy duty brake system may merely comprise the renewal of bushings or return springs and/or the renewal of the brake linings, considerable time must be spent in preforming this maintenance inasmuch as the associated wheel or wheels must be pulled after the vehicle has been jacked to an elevated position with its wheels spaced above the ground.

Inasmuch as this additional time-consuming labor not only results in brake maintenance being expensive in view of the mechanic's time involved in order to perform the maintenance, but the additional "downtime" of the vehicle results in loss of utilization of that vehicle and thus the revenue normally associated with its operation.

It is accordingly the main object of this invention to provide a wheel brake system for heavy duty vehicles constructed in a manner whereby all moving parts and wear surfaces of a brake system, with the exception of the brake drum, may be removed and replaced or otherwise service without removal of the associated wheel.

A further object of this invention, in accordance with the preceding object, is to provide a wheel brake system which may be substantially fully disassembled without removal of the associated wheel.

Still another object of this invention is to provide a wheel brake system utilizing a driven oscillatable shaft for spreading one pair of adjacent ends of the pair of brake shoes utilized in the brake system through an S-cam mounted on the shaft for rotation therewith whereby the spreading of the brake shoes upon actuation of the brakes will be effected evenly.

A final object of this invention to be specifically enumerated herein is to provide a wheel brake system for heavy duty vehicles in accordance with the preceding objects which will conform to conventional forms of manufacture, be of simple construction and easy to service so as to provide a device that will be economically feasible, long lasting and require a minimum of labor in servicing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
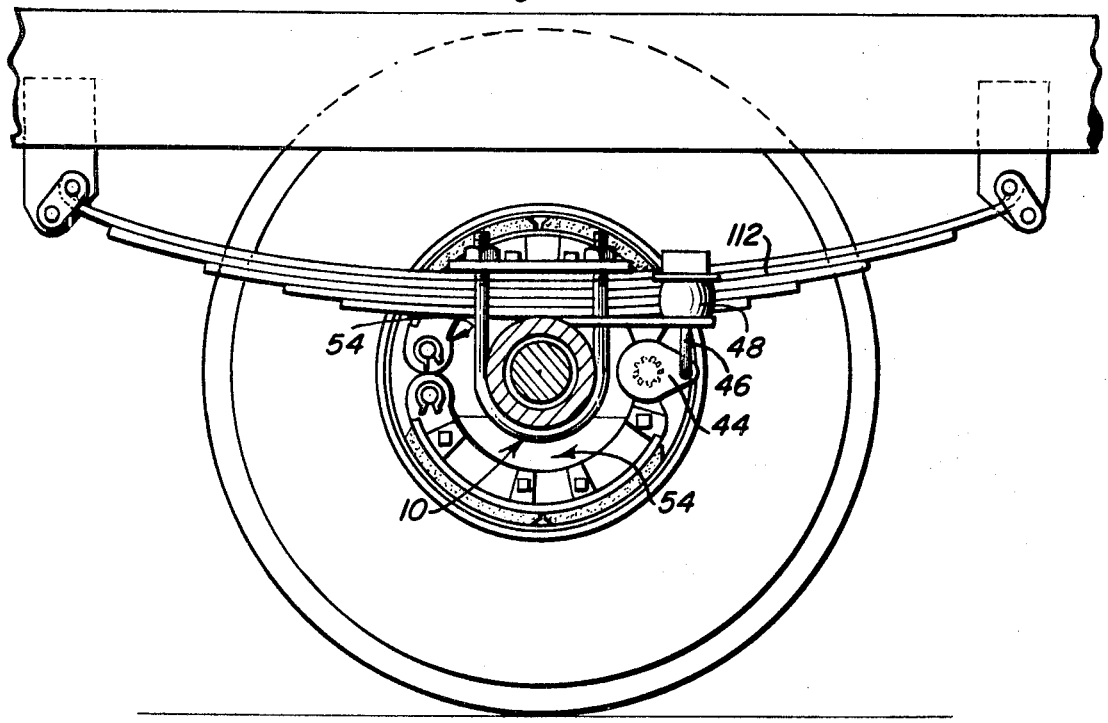
FIG. 1 is a fragmentary longitudinal vertical sectional view of a heavy duty running gear assembly utilizing a wheel brake system constructed in accordance with the present invention.
Figure 6:
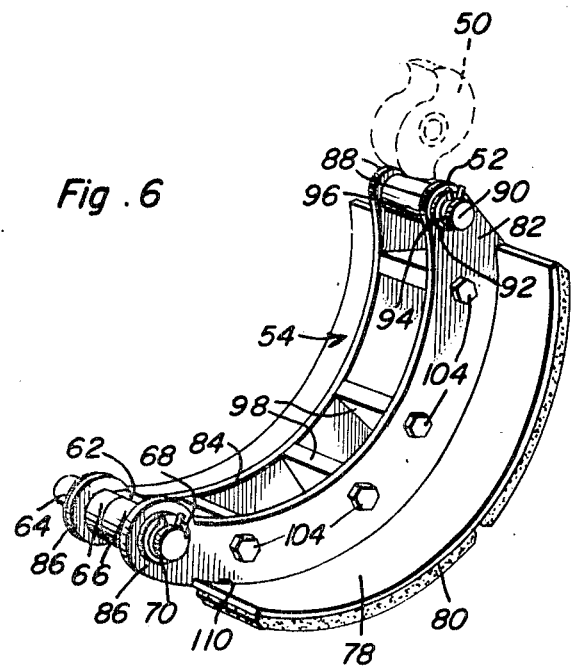
FIG. 6 is a perspective view of one of the brake shoes of the system.
Figure 7:
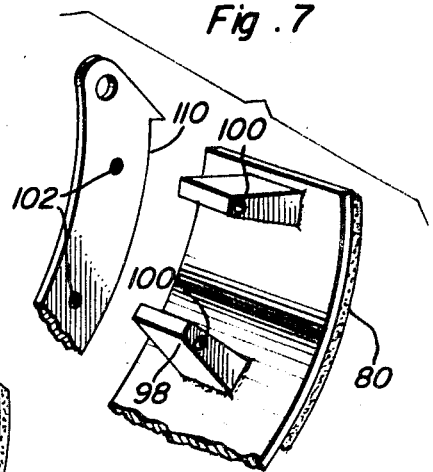
FIG. 7 is a fragmentary exploded perspective view of the upper end portion of the brake shoe illustrated in FIG. 6.
Figure 2:
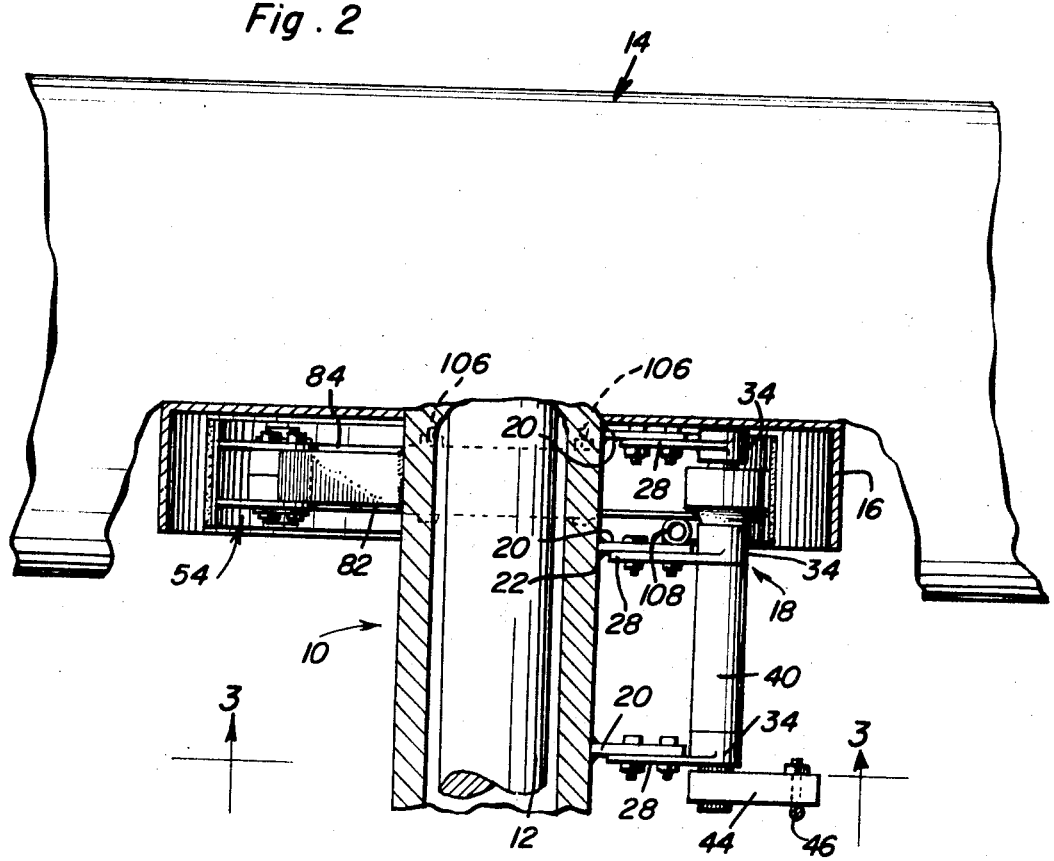
FIG. 2 is a fragmentary horizontal sectional view taken substantially upon a plane passing along the longitudinal center line of the axle assembly of the running gear illustrated in FIG. 1.
Figure 3:
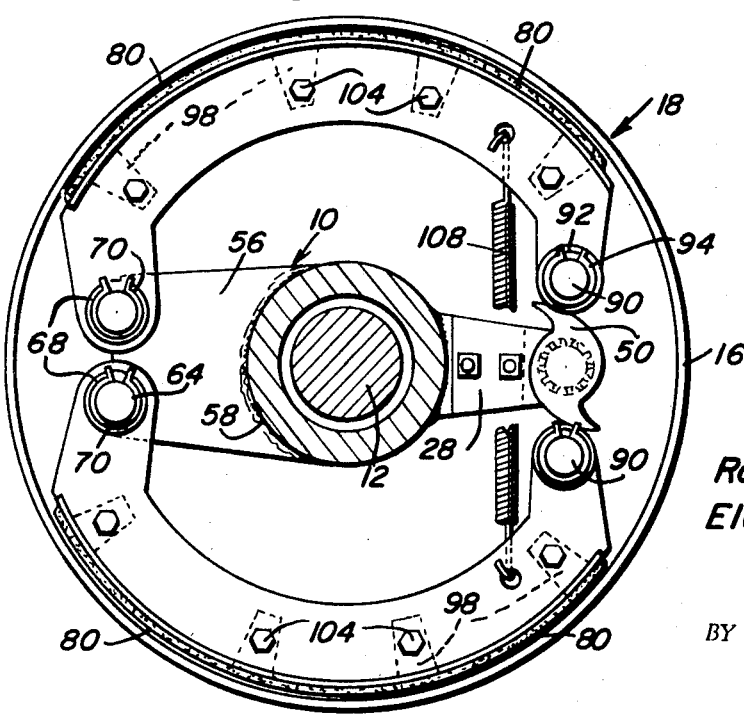
FIG. 3 is a fragmentary longitudinal vertical sectional view taken substantially upon a plane extending along the section line 3—3 of FIG. 2.
Figure 4:
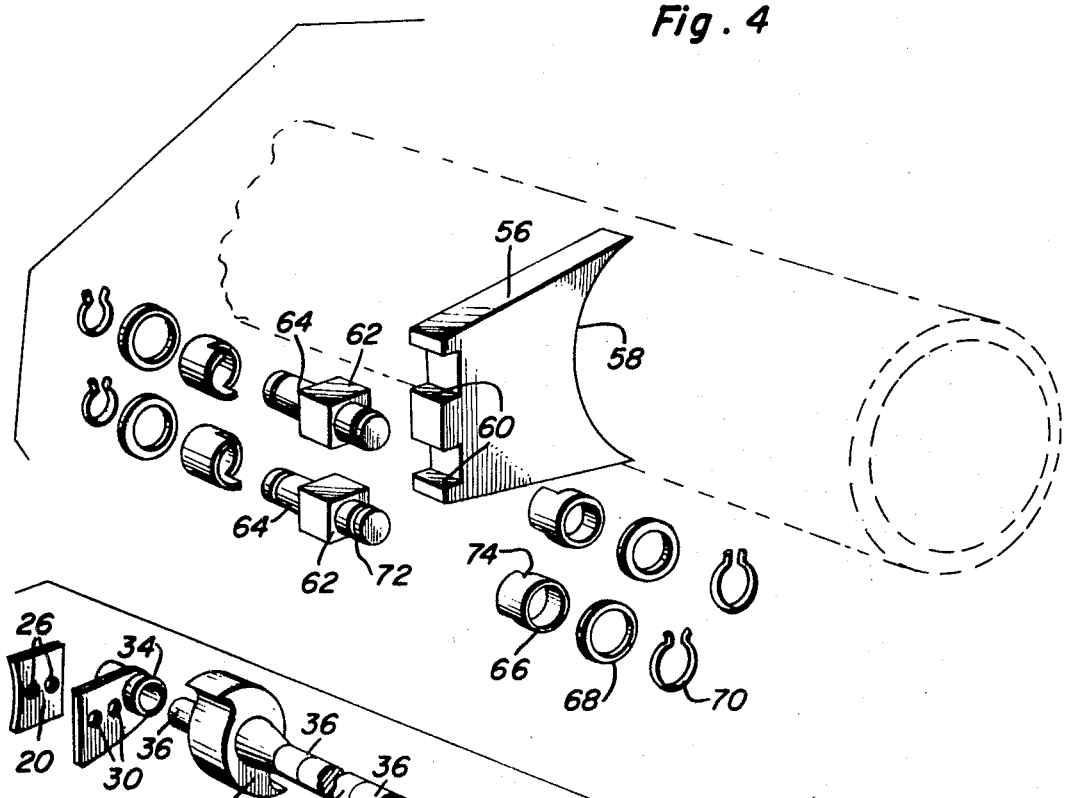
FIG. 4 is a fragmentary exploded perspective view of the structure of the brake system by which the heel ends of the brake shoes are supported for oscillation.
Figure 5:
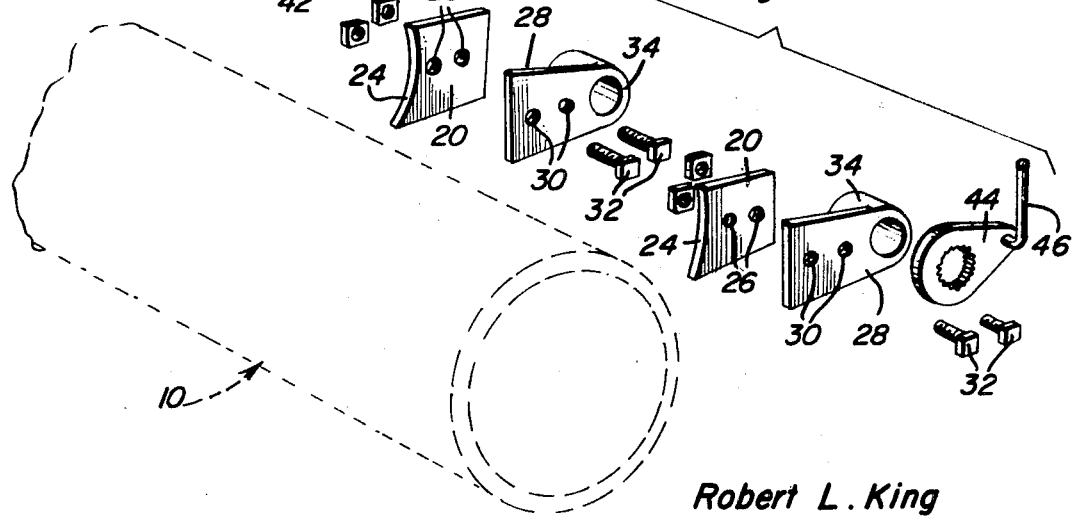
FIG. 5 is a fragmentary exploded perspective view of the structure by which the toe ends of the brake shoes of the system are spread apart during actuation of the brake system.

Referring now more specifically to the drawings, the numeral 10 generally designates a drive axle housing of a heavy duty vehicle having a driven axle shaft 12 journaled therethrough. A wheel assembly referred to in general by the reference numeral 14 is mounted on the outboard end of the axle shaft and includes a conventional brake drum 16 comprising a part of the wheel brake system of the instant invention which is referred to in general by the reference numeral 18.

The system 18 includes three similar mounting brackets 20 secured to longitudinally spaced portions of the axle housing 10 in any convenient manner such as by welding 22. Each of the mounting brackets 20 includes an arcuate edge portion 24 for embracingly engaging the housing 10 along the weld 22 and each mounting bracket 20 has a pair of apertures 26 formed therein.

Three similar journal brackets 28 each provided with a pair of apertures 30 registrable with the corresponding apertures 26 are removably secured to the mounting brackets 20 by means of fasteners 32 secured through the pairs of registered apertures 26 and 30. The journal brackets 28 include aligned journal portions 34 through which portions 36 of a camshaft 38 are rotatably journaled and a tube 40 is disposed about the camshaft 38 intermediate the journal portions 34.

The inner end portion of the camshaft 38 is splined as at 42 and has an actuating lever 44 mounted thereon. A motion transmitting rod 46 has one end pivotally supported from the outer end of the lever 44 and the other end is connected to a suitable fluid motor 48 which is in turn supported from the axle housing 10 in any conventional manner.

The end of the camshaft 38 remote from the splines 42 has an S-shaped cam 50 mounted thereon and the cam 50 is operable on the toe ends 52 of a pair of similar brake shoes referred to in general by the reference numerals 54.

A third and larger mounting bracket 56 is provided and includes an arcuate edge 58 for embracing the housing 10 and which is secured to the latter by welding. The mounting bracket includes a pair of notches 60 in its outer end in which the square midportions 62 of a pair of double-ended pivot pins 64 are secured by welding.

A pair of notched sleeve type bushings 66 are disposed on the opposite ends of each pivot pin 64. The bushings are each secured on the corresponding pivot pin end by means of a washer 68 and a snap ring 70. Each snap ring 70 is removably seatably engageable in a circumferential groove 72 formed in the corresponding pivot pin 64 and the notched inner ends 74 of each pair of bushings 66 key with the square central portion 62 of the corresponding pivot pin 64 in order to prevent rotation of the bushings 66 relative to the pivot pins 64.

Each of the brake shoes 54 includes an arcuate band 78 to whose outer convex surface brake lining material 80 is secured. In addition, each of the shoes 54 includes a pair of inner and outer arcuate plates 82 and 84 having one set of corresponding bushings 66 by means of the associated washers 68 and snap rings 70. In addition, each pair of arcuate plates 82 and 84 includes a second pair of corresponding ends 88 which are apertured and secured on the opposite ends of a connecting shaft 90 by means of washers 92 and snap rings 94 corresponding to the washers and snap rings 68 and 70. The shaft 90 is merely a straight cylindrical shaft having grooves (not shown) formed in its remote ends corresponding to the grooves 72 and in which the snap rings 94 are secured. In addition, the shaft 90 has a sleeve roller 96 mounted thereon intermediate corresponding ends 88 of the arcuate plates 82 and 84.

The band 78 includes a plurality of generally radially inwardly projecting spacing blocks or projections 98 secured thereto at points spaced therealong and each of the blocks 98 is provided with a bore 100 registrable with corresponding apertures 102 formed in the arcuate plates 82 and 84. Through bolts 104 are secured through the apertures 102 and the bores 100 by means of threaded nuts 106 and the opposite ends of the S-cam 50 are engageable with the sleeve rollers 96 carried by the toe ends 52 of the brake shoes 54.

The blocks 98 are clampingly secured between the arcuate plates 82 and 84 by means of the through bolts 104 and a suitable return spring 108 is connected between the toe end portions of each pair of shoes 54 so as to maintain the sleeve rollers 96 in engagement with the S-cam 50, even when the brake shoes 54 are fully retracted.

If it is desired, the sleeve roller 96 may be formed as an integral largest diameter central portion of the shaft 90 with the opposite ends of the shaft 90 freely journaled through the toe end portions of the arcuate plates 82 and 84.

In operation, when it is desired to remove the bands 78 in order that the brake lining material 80 may be replaced or the entire bands 78 may be replaced, the through bolts are removed from the inner arcuate 82 side of the brake shoe 54. Then, the snap rings 70 and 94 may be removed thus enabling the inner arcuate plate 82 to be removed. Thereafter, the brake shoe 54 including the band 78, the brake lining material 80 and the abutment or spacing blocks 98 may be withdrawn axially of the drum 16. Of course, inasmuch as the band 78 projects considerably outwardly of the outer arcuate plate 84, if it is desired to replace the bushings 74 the outer snap ring 70 may be removed in order that the outer bushings 74 may be removed and replaced. Further, once the inner arcuate plate 82 has been removed, the shaft 90 and the sleeve 96 may be removed merely by removing the outside snap ring 94. Also, removal of the bolts 32 and the actuating lever 44 enables the camshaft 38 and the cam 50 to be fully axially withdrawn from the drum 16. Still further, it will be noted that the radial outermost arcuate edges of the arcuate plates 82 and 84 are similarly notched as at 110 for positively keying the band 78 to the plates 82 and 84 independent of the through bolts 104.

It will of course be noted that the lower band 78 must first be removed before the upper band 78 is removed. Once the lower band has been removed, the upper band 78 may then be loosened in the same manner and rotated to a position below the axle housing 10 for subsequent inward axial withdrawal from the drum 16 inasmuch as the upper brake shoe cannot be axially withdrawn while disposed above the axle housing 10 due to interference with the leaf spring 112. Of course, if the leaf spring 112 is mounted below the axle housing 110, the upper shoe 54 must first be removed and then the lower shoe may be rotated to a position above the axle housing 10 for axial withdrawal from the drum 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel brake system for a truck or other heavy duty vehicle, said brake system including a mounting bracket for securement to one side of an axle housing portion disposed within a brake drum, a pair of mounting pins supported from said bracket in position to generally parallel said housing, a pair of brake shoes each including a pair of parallel laterally spaced arcuate plates having corresponding heel ends removably oscillatably supported from the opposite ends of one of said pins, an elongated semicylindrical band having brake lining material secured to its outer convex surface and positioned with its inner concave surface overlying and extending along the outer convex edges of said arcuate plates, and a plurality of spacer blocks carried by said band and projecting inwardly between said plates from the concave surface of said band at points spaced therealong, and means removably secured between said plates securing said spacer blocks between said plates, whereby removal of the innermost plate will free said band for axial withdrawal from said drum.

2. The combination of claim 1 wherein said ends of said pins each include a sleeve bearing removably secured thereon against rotation relative thereto.

3. The combination of claim 1 wherein the toe ends of each pair of said plates has a roller journaled therebetween, an operating shaft for disposition on a second side of said axle housing remote from said bracket and adapted to be supported for rotation about an axis generally paralleling said axle housing, one end of said shaft having an S-cam thereon for disposition between said roller.

4. The combination of claim 3 including a pair of mounting brackets for securement to longitudinally spaced portions of said second side of said housing, a pair of journal members removably supported from said pair of mounting brackets, the other end portion of said shaft being journaled from said journal members.

5. The combination of claim 1 wherein the outer marginal edges of said plates are notched and seatingly receive the opposing longitudinal edge portions of said semicylindrical band therein.

6. The combination of claim 5 wherein said ends of said pins each include a sleeve bearing removably secured thereon against rotation relative thereto.

7. The combination of claim 6 wherein the toe ends of each pair of said plates has a roller journaled therebetween, an operating shaft for disposition on a second side of said axle housing remote from said bracket and adapted to be supported for rotation about an axis generally paralleling said axle housing, one end of said shaft having an S-cam thereon for disposition between said roller.

8. The combination of claim 7 including a pair of mounting brackets for securement to longitudinally spaced portions of said second side of said housing, a pair of journal members removably supported from said pair of mounting brackets, the other end portion of said shaft being journaled from said journal members.

9. A brake shoe construction including a pair of parallel laterally spaced arcuate plates, an elongated semicylindrical band having brake lining material secured to its outer convex surface and positioned with its inner concave surface overlying and extending along the outer convex edges of said arcuate plates, a plurality of spacer blocks carried by said band and projecting inwardly between said plates from the concave surface of said band at points spaced therealong, and fastener means removably secured through said plates and said spacer blocks securing said plates to the opposite sides of said spacer blocks, and elongated connecting members removably secured between each pair of corresponding ends of said arcuate plates for support of said shoe construction therefrom.

10. A brake shoe construction including a pair of parallel laterally spaced arcuate plates, an elongated semicylindrical band having brake lining material secured to its outer convex surface and positioned with its inner concave surface overlying and extending along the outer convex edges of said arcuate plates, and a plurality of spacer blocks carried by said band and projecting inwardly between said plates from the concave surface of said band at points spaced therealong, and means removably secured between said plates securing said spacer block between said plates, the outer marginal edges of said plates being notched and seatingly receive the opposing longitudinal edge portions of said semicylindrical band therein.

11. The combination of claim 5 wherein the toe ends of each pair of said plates has a roller journaled therebetween, an operating shaft for disposition on the second side of said axle housing remote from said bracket and adapted to be supported for rotation about an axis generally paralleling said axle housing, one end of said shaft having an S-cam thereon for disposition between said roller.

12. The combination of claim 11 including a pair of mounting brackets for securement to longitudinally spaced portions of said second side of said housing, a pair of journal members removably supported from said pair of mounting brackets, the other end portion of said shaft being journaled from said journal members.

* * * * *